United States Patent [19]
Graham

[11] 3,860,693
[45] Jan. 14, 1975

[54] PRODUCTION OF CYCLIC PHOSPHONITRILIC CHLORIDE POLYMERS

[75] Inventor: John C. Graham, Grand Island, N.Y.

[73] Assignee: Hooker Chemicals & Plastics Corp., Niagara Falls, N.Y.

[22] Filed: Apr. 26, 1972

[21] Appl. No.: 247,655

[52] U.S. Cl. ............................................. 423/300
[51] Int. Cl. .......................................... C01b 25/10
[58] Field of Search .................................. 423/300

[56] References Cited
UNITED STATES PATENTS

| | | | |
|---|---|---|---|
| 3,359,080 | 12/1967 | Ridgway et al. | 423/300 |
| 3,367,750 | 2/1968 | Jaszka et al. | 423/300 |
| 3,407,047 | 10/1968 | Paddock et al. | 423/300 |
| 3,669,633 | 6/1972 | Beinfest et al. | 423/300 |

FOREIGN PATENTS OR APPLICATIONS 354,078       Germany

Primary Examiner—M. Weisman
Attorney, Agent, or Firm—Peter F. Casella; James F. Mudd

[57] ABSTRACT

In the production of phosphonitrilic chlorides by the in situ preparation of ammonium chloride by reacting ammonium and hydrogen chloride in the presence of a metallic salt catalyst and an inert solvent, the yield and purity are increased and the reaction time decreased by the subsequent in situ formation in the same reactor of phosphorus pentachloride by the reaction of chlorine and phosphorus trichloride.

8 Claims, No Drawings

PRODUCTION OF CYCLIC PHOSPHONITRILIC CHLORIDE POLYMERS

BACKGROUND OF THE INVENTION

1. FIELD OF THE INVENTION

This invention relates to improvements in a method of manufacture of phosphonitrilic chloride polymers (chlorophosphazenes) whereby a high proportion of cyclophosphonitrilic chloride polymers is produced.

The cyclic trimer and tetramer phosphonitrilic chloride polymers are in demand because of their elastic, heat and fireresistant qualities for such applications as coatings for ceramics and metals, fireproofing of textiles, additives for increasing heat resistance and as a reactant, in preparing thermally stable resins. Accordingly, it is necessary to provide suitable means of increasing yields of lower cyclic polymers if their commercial manufacture is to be economically feasible.

2. DESCRIPTION OF PRIOR ART

The formation of polymeric phosphonitrilic chlorides has been described in Chemical Reviews, line 32, pp. 111–127 (1943) by Audreith et al. A method described for the preparation involves refluxing phosphorus pentachloride and ammonium chloride in an inert solvent. A mixture of polymers is obtained upon completion of the reaction. The mixture consists of cyclic phosphonitrilic chloride polymers $(PNCl_2)_n$ wherein n is an integer of 3 or more and linear phosphonitrilic chloride chains end blocked with the elements of phosphorus pentachloride and having a probable formula $(PNCl_2)_n PCl_4$.

U.S. Pat. No. 3,367,750 describes an improved method of preparing phosphonitrilic chlorides by the substitution of ammonium chloride prepared in situ to replace the ammonium chloride dispersion made by grinding procedures such as ball milling. Yield based upon the amount of phosphorus pentachloride charged was found to be 98 percent cyclic polymers with the yield of phosphonitrilic chloride trimer being 63 percent. The approximate time to 90 percent completion of the reaction was about 4 hours.

U.S. Pat. No. 3,359,080 discloses an improved method of preparing cyclic phosphonitrilic chloride polymers by preparing phosphorus pentachloride in situ by the addition of chlorine to phosphorus trichloride during the course of the reaction. Control of the reaction can be achieved by regulating the rate of chlorine addition so that the actual rate of hydrogen chloride evolution is at least 40 percent of the theoretical hydrogen chloride evolution rate. The product, obtained in 94 percent yield based on $PCl_3$, contained a mixture of phosphonitrilic chlorides which when analyzed showed 17 percent linear phosphonitrilic chlorides, 59 percent trimeric phosphonitrilic chloride, 10% tetrameric phosphonitrilic chloride, and 14 percent higher cyclic phosphonitrilic chlorides.

U.S. Pat. No. 3,462,247 and U.S. Pat. No. 3,407,047 disclose the use of certain anhydrous metallic salts to promote the reaction between phosphorous pentachloride and ammonium chloride by increasing the rate of reaction. Such salts include aluminum chloride, magnesium chloride and zinc chloride.

SUMMARY OF THE INVENTION

This invention relates to a novel method of preparing phosphonitrilic chloride polymers in high yield containing as high as about 90 percent yield of the phosphonitrilic chloride trimer. Reaction time is reduced significantly in comparison to methods of the prior art. In general, the reaction is carried out by first preparing ammonium chloride in situ by the reaction of ammonia and hydrogen chloride at room temperature, followed by an in situ preparation in the same reactor at an initial temperature of about 110° centigrade of phosphorus pentachloride from phosphorus trichloride and elemental chlorine. The reaction is conducted in a solvent inert to the raw materials and the reaction products having a boiling point which will allow reaction to proceed preferably under reflux conditions and in equipment which will prevent loss of phosphorus trichloride as well as solvent during the course of the reaction.

By the method of the invention, phosphonitrilic chloride polymers have been obtained in yields of 98 percent, with the yield of phosphonitrilic chloride trimer as high as 92 percent of the total yield.

DESCRIPTION OF THE PREFERRED EMBODIMENTS

Ammonium chloride is produced in situ by the process of the invention having a particle size in the range of from 1 to 5 microns, based upon microscopic measurements. The ammonium chloride possesses a specific surface of about $2.6 \times 10^4$ square centimeters per gram which is approximately 7 times more available surface than that of ammonium chloride produced by wet ball milling. Typically, commercially available ammonium chloride possesses a specific surface of about 800 square centimeters per gram.

The reaction of ammonia and hydrochloric acid gas is exothermic. It is desirable to maintain the reaction medium at a temperature in the range of about 10° to about 40° centigrade. Employment of higher temperatures will cause the crystalline ammonium chloride to fuse together and therefore defeat the purpose of this invention. In practicing this invention, it has been found useful to agitate the reaction media in order to eliminate localized hotspots in the reaction media. Once the ammonium chloride has been formed in situ, phosphorus trichloride is added to the reaction mixture consisting of the ammonium chloride formed in situ and a solvent which is inert to the raw materials and the reaction products at reflux temperatures.

The chlorine and phosphorus trichloride may be added to the ammonium chloride-solvent mixture simultaneously but it is more convenient to add all the phosphorus trichloride to the ammonium chloride-solvent mixture at the outset and then introduce the chlorine gradually. In either case it is advantageous to pass the chlorine, or the chlorine and phosphorus trichloride, into the refluxing mixture over a period of time ranging from the first half to substantially the total time during which reaction takes place, whereby a high yield of lower cyclic polymers, especially the trimer, is produced.

Solvents useful in this process have boiling points which allow the reaction of phosphorus pentachloride and ammonium chloride to proceed preferably under reflux conditions, are inert to the raw materials and reaction products and also are effective solvents for phosphorus pentachloride. Lastly, the solvent boiling point should be sufficiently low that the solvent may be removed afterwards from the crude phosphonitrilic polymer without further polymerization. It is preferred to use chlorobenzene as the solvent in the process of the invention although other chlorinated hydrocarbon solvents or phosphorus oxychloride can be used. Among the other satisfactory solvents are trichlorobenzenes, orthodichlorobenzene, sym-tetrachloroethane and tetrachloroethylene. Still other useful solvents are benzyl chloride, chloroform and carbon tetrachloride. Chlorobenzene is a suitable solvent since it offers a comparatively low boiling point, is economical, less toxic than tetrachloroethane and readily available. An important factor affecting the rate of reaction to form phosphonitrilic chloride is the reaction temperature. Therefore, the chlorinated hydrocarbon solvent used should boil at atmospheric pressure, at 110° centigrade or higher.

It has been found that a chlorine flow rate of about 0.2 to about 0.6 mol per hour per mol of phosphorus trichloride at a reaction temperature of about 100° to about 135° centigrade results in high yields of the cyclic phosphonitrilic chloride polymer and less than 0.5 percent of linear phosphonitrilic chloride polymers. Thus, no purification procedures are needed to remove linear phosphonitrilic chloride polymers. The phosphonitrilic chloride polymers produced by the method of this invention are colorless, white solids.

As previously noted hereinbefore, it is known in the prior art that the use of certain metallic salts capable of forming coordination complexes with nucleophilic species such as ammonia and amines promotes the reaction between phosphorus pentachloride and ammonium chloride. Such materials include anhydrous metallic salts such as cobaltous chloride, aluminum chloride, manganous chloride, cupric chloride, stannic chloride, magnesium chloride, zinc chloride, and titanium chloride. The use of the term "catalyst" hereinafter refers to these metallic salts.

By the method of the invention, it has been found that such anhydrous metallic salts neither increase the yield of the product of the invention, nor speed the reaction time. However, the purity of the phosphonitrilic chloride polymers produced as indicated by the ratio of the proportion of cyclic trimer to cyclic tetramer is greatly increased by the inclusion of such anhydrous metallic salts. Thus, the amount of linears and higher cyclics other than the cyclic trimer and tetramer in the phosphonitrilic chloride polymers produced is decreased and the color is improved by the inclusion of such catalysts.

The product liquor can be separated from the excess ammonium chloride contained therein by passing the hot liquor through a filter. Of the classes of filters, i.e., vacuum, gravity and pressure, vacuum is preferred, although gravity can be used without difficulty. In keeping with good engineering practice, filter aids, such as diatomaceous earth, can be used to increase filtration rate. Conventional filter media are suitable for this process.

According to a preferred embodiment of the present invention the interaction of gaseous ammonia and gaseous hydrogen chloride is effected by bubbling these gases in nearly stoichiometric quantities into an inert hydrocarbon solvent which is maintained at room temperature, the ammonia being introduced into the reaction vessel on the side of the vessel opposite the point where the hydrogen chloride is introduced thereby securing a gradual intimate intermixing of the gases. Ample liquor depth is provided to produce a product in the liquid medium. Loss of ammonia and hydrochloric acid and the reaction product from the reaction vessel is negligible.

Having formed the ammonium chloride in situ, phosphorus pentachloride is next formed in situ in the same reactor at an initial temperature of about 110° centigrade by adding phosphorus trichloride to the reactor and thereafter adding chlorine gas at a rate of about 0.2 to about 0.6 mol per hour per mol of phosphorus trichloride present. Results show that an optimum purity of cyclic phosphonitrilic chloride trimer is obtained by using an excess of ammonium chloride in relation to the phosphorus pentachloride formed in situ. Excess amounts of ammonium chloride varying between 10 and 70 weight percent have been evaluated and optimum purity of said trimer occurs between the proportions of 17 to 24 percent by weight excess ammonium chloride based upon the weight of the phosphorus pentachloride formed.

There is a general relationship of temperature to composition of crude phosphonitrilic polymers formed. As the temperature is increased up to about 300° centigrade progressively higher amounts of the linear phosphonitrilic chloride polymers are formed. It has been found desirable to control the temperature through all steps of the invention and not just in the first step of forming the crude phosphonitrilic chloride polymers if the objects of this invention are to be achieved. From the table below of boiling points of solvents inert to chlorination, it will be seen that various reflux temperatures can be obtained by appropriate choice of solvent while reacting the ammonium chloride and phosphorus pentachloride.

| Reaction media: | Boiling point, °C |
| --- | --- |
| Chloroform | 61 |
| Carbon tetrachloride | 77 |
| Phosphorus oxychloride | 107 |
| Tetra-chloroethylene | 121 |
| Mono-chlorobenzene | 132 |
| Sym-tetra-chloroethane | 146 |
| Benzyl chloride | 179 |
| O-dichlorobenzene | 180 |
| Trichlorobenzenes | 208–218 |

Preferably the temperature employed during said reaction should be between 110° and 150° centigrade so that the greatest possible amount of trimeric phosphonitrilic chloride can be formed in an economically reasonable period of time.

The reaction mixture is maintained at approximately reflux temperature of the constant boiling azeotrope of $PCl_3$ and the solvent employed, preferably chlorobenzene. The reaction continues at refluxing temperature which rises during the course of the reaction from about 110° to about 132° centigrade. The course of the reaction can be readily followed by recording either the temperature of the refluxing liquid, the evolution of HCl or the amount of chlorine gas consumed. The excess of ammonium chloride is filtered off and the solution concentrated under reduced pressure at as low a temperature as possible.

The following examples illustrate the various aspects of the invention but are not intended to limit it. Where not otherwise specified throughout this specification and claims, temperatures are given in degrees centigrade and parts are by weight.

EXAMPLE 1

Ammonium chloride was prepared in situ by reacting ammonia and hydrogen chloride gas in 250 cubic centimeters of chlorobenzene at room temperature. A total of 25 grams (0.47 mol) was prepared and to this mixture was added 55 grams of phosphorus trichloride (0.4 mol). The ammonium chloride is present in the proportion of 17 percent excess based on the phosphorus trichloride. A magnesium chloride catalyst was added in the amount of 0.5 gram. A dry ice condenser was attached to the reaction vessel and the mixture in the reaction vessel was heated to 110° centigrade with rapid stirring. Chlorine gas was then introduced at a rate of about 15 grams (0.2 mol) per hour. Within 1 ¾ hours, the reaction temperature rose from 110° to 132° centigrade. The reaction was stopped and the excess ammonium chloride was filtered off to yield a clear colorless solution. The amount of chlorobenzene solvent was next removed to yield 44 grams of $(PNCl_2)_n$ representing a 96 percent yield based upon the phosphorus trichloride used. The sample was analyzed by gas chromatography analysis and found to contain 86.1 percent of the cyclic trimer of phosphonitrilic chloride, 9.4 percent of the cyclic tetramer of phosphonitrilic chloride, 4.4 percent higher cyclic phosphonitrilic chloride and less than 0.5 percent linear phosphonitrilic chloride. Analysis of the linear phosphonitrilic chloride was by a petroleum ether extraction technique wherein the crude mixture was extracted with excess quantities (approximately 1 liter each) of warm petroleum ether (boiling point 40° to 60° centigrade) until no further soluble material was extracted. This process dissolves out all the cyclic polymers which are then recovered as a semicrystalline mixture by distilling the petroleum ether from the solution. The residual insoluble product is a mixture of linear phosphonitrilic chloride polymers. Gas chromatographic analysis of the recovered chlorobenzene solvent showed that the solvent is not chlorinated under these conditions.

EXAMPLE 2

Following the procedure of Example 1, phosphonitrilic chloride polymers were produced using the same proportions of ingredients and reaction procedures with the exception that the ammonium chloride is present in a proportion of 20 percent excess based on the phosphorus trichloride and the magnesium chloride catalyst was omitted. A 96 percent yield based upon the phosphorus trichloride used was obtained after a reaction time of 2 hours and 20 minutes. Analysis for linear phosphonitrilic chloride was by a petroleum ether extraction technique, as described in Example 1. 12.9 percent linear phosphonitrilic chloride was found. A sample representative of the remaining cyclic phosphonitrilic chloride polymers was analyzed by gas chromatography and found to contain 82.6 percent of the cyclic trimer of phosphonitrilic chloride, 11.3 percent of the cyclic tetramer of phosphonitrilic chloride, and 4.4 percent of the higher cyclic phosphonitrilic chloride.

EXAMPLE 3 (Control)

Following the procedure of Example 1, ammonium chloride was prepared in situ by reacting ammonia and hydrogen chloride gas in 250 cubic centimeters of chlorobenzene at room temperature. A total of 0.58 mole was prepared and to this mixture was added 83.2 grams of phosphorus pentachloride. The solid phosphorus pentachloride was added slowing at reflux temperature (130° centigrade) over a period of 2½ hours. The reaction mixture was refluxed an additional 15 minutes with a total evolution of 50 grams of hydrogen chloride (105 percent of the theoretical evolution of hydrogen chloride according to the equation:

$$PCl_5 + NH_4Cl \rightarrow PNCl_2 + 4HCl\ )$$

A clear product was obtained in a yield of 42 grams which was colored and given the rating "good" on the rating scale of "excellent, good, fair, poor." The product obtained was filtered to remove ammonium chloride and one-half by volume of the product obtained was passed through filler's earth while warm in order to decolorize. Samples of both decolorized and color product were analyzed by gas chromatography. The decolorized sample was found to contain 72.2 percent of the cyclic trimer of phosphonitrilic chloride and 18.6 percent of the cyclic tetramer of phosphonitrilic chloride and 8.8 percent of higher cyclic phosphonitrilic chlorides. Linear phosphonitrilic chlorides were not analyzed for by the petroleum ether extraction technique. The colored product was analyzed by gas chromatography analysis and found to contain 69.4 percent of the cyclic trimer of phosphonitrilic chloride, 19.4 percent of the cyclic tetramer of phosphonitrilic chloride, and 10.2 percent of the higher cyclic phosphonitrilic chlorides. The yield was 91 percent based upon the phosphorus pentachloride used.

EXAMPLES 4-7

Following the procedure of Example 1, phosphonitrilic chloride polymers were produced by the method of the invention using varying amounts of ammonium chloride in excess of the phosphorus trichloride. Results are summarized in Table 1 below:

TABLE 1

Influence of Excess NH$_4$Cl On Preparation of $(PNCl_2)_n$

| Example | % Excess NH$_4$Cl | Cyclic Trimer/ Cyclic Tetramer | Yield (%) | Cyclic's (%) | | |
|---|---|---|---|---|---|---|
| | | | | Trimer | Tetramer | Others |
| 4 | 10 | 7.15 | 95 | 81.7 | 11.4 | 6.8 |
| 1 | 17 | 9.15 | 95 | 86.1 | 9.4 | 4.5 |
| 5 | 24 | 8.65 | 95 | 84.9 | 9.8 | 5.2 |
| 6 | 50 | 8.2 | 96 | 82.8 | 10.3 | 6.7 |
| 7 | 70 | 8.5 | 92 | 82.7 | 9.7 | 7.4 |

EXAMPLES 8-10

Following the procedure of Example 1, and the proportions of Example 1, the effect of the chlorine flow rate on the preparation of phosphonitrilic chloride polymers was determined. Results shown in Table 11 below indicate that optimum yield was obtained at a flow rate of about 15 grams per hour of chlorine gas:

TABLE 11

Effect of Chlorine Flow Rate on Preparation of $(PNCl_2)_x$

| Example | $Cl_2$ | % Excess $NH_4Cl$ | Cyclic Trimer/ Cyclic Tetramer | Linears (%) | Yield (%) |
|---------|--------|-------------------|-------------------------------|-------------|-----------|
| 8 | ~8g/hr | 24 | 8.7 | 4 | 90 |
| 9 | ~15g/hr | 20 | 8.7–9.2 | 0.5–3 | 95–96 |
| 10 | ~30g/hr | 20 | 7.9 | — | 81 |

While this invention has been described with reference to certain specific embodiments, it will be recognized by those skilled in the art that many variations are possible without departing from the scope and spirit of the invention.

What is claimed is:

1. The method of preparing phosphonitrilic chloride polymers which comprises:
   1. reacting ammonia and hydrogen chloride in an inert solvent to form a dispersion of ammonium chloride in said solvent,
   2. reacting phosphorus trichloride and elemental chlorine in the presence of said dispersion of ammonium chloride in said solvent to produce phosphorus pentachloride, and
   3. reacting said phosphorus pentachloride with said ammonium chloride in the presence of an anhydrous metallic salt catalyst selected from the group consisting of cobaltous chloride, aluminum chloride, magnesium chloride, zinc chloride, cupric chloride, stannic chloride, manganous chloride and titanium chloride to form a phosphonitrilic chloride reaction product comprising at least 81.7% of the cyclic trimer of phosphonitrilic chloride and up to 4% linear phosphonitrilic chloride polymers.

2. A method according to claim 1 wherein the ammonium chloride particle size does not exceed 5 microns.

3. A method according to claim 2 wherein said ammonium chloride is present during the reaction in a proportion which is in a molecular excess of at least 10 percent of the phosphorus trichloride.

4. A method according to claim 3 wherein said polymers are recovered from the reaction product.

5. A method according to claim 4 which comprises heating a mixture of said ammonium chloride with said phosphorous trichloride and elemental chlorine at the reflux temperature of said mixture.

6. A method according to claim 5 wherein the inert solvent is a chlorinated hydrocarbon having a boiling point in excess of 100 degrees centigrade.

7. A method according to claim 6 wherein the chlorinated hydrocarbon is selected from the group consisting of chlorobenzene, ortho-dichlorobenzene, sym-tetra-chloroethane, trichlorobenzene and tetrachloroethylene.

8. A method of preparing phosphonitrilic chloride polymers which comprises:
   1. reacting ammonia and hydrogen chloride in an inert solvent to form a dispersion of ammonium chloride in said solvent wherein said ammonium chloride has a particle size of from about 1 to about 5 microns and said solvent has a boiling point sufficiently low that the solvent may be removed afterwards from the solution without further substantial polymerization,
   2. heating a mixture of said ammonium chloride with said phosphorus trichloride and elemental chlorine at the reflux temperature of said mixture in the presence of a metallic chloride catalyst selected from the group consisting of cobaltous chloride, aluminum chloride, magnesium chloride, zinc chloride, cupric chloride, stannic chloride, manganous chloride and titanium chloride,
   3. reacting phosphorus tichloride and elemental chlorine in the presence of said dispersion of ammonium chloride in said solvent to produce phosphorus pentachloride,
   4. reacting said phosphorus pentachloride with said ammonium chloride at a temperature from about 110° centigrade to about 150° centigrade to produce said phosphonitrilic chloride polymers comprising at least 81.7 percent of the cyclic trimer of phosphonitrilic chloride and up to 4 percent linear phosphonitrilic chloride polymers.

* * * * *